US011240832B2

(12) United States Patent
Zhao et al.

(10) Patent No.: US 11,240,832 B2
(45) Date of Patent: Feb. 1, 2022

(54) COMMUNICATION METHOD AND COMMUNICATIONS APPARATUS

(71) Applicant: Huawei Technologies Co., Ltd., Shenzhen (CN)

(72) Inventors: Li Zhao, Shanghai (CN); Xing Liu, Shenzhen (CN); Qufang Huang, Shanghai (CN); Chunhua You, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/787,944

(22) Filed: Feb. 11, 2020

(65) Prior Publication Data

US 2020/0178278 A1 Jun. 4, 2020

Related U.S. Application Data

(63) Continuation of application No. PCT/CN2018/100082, filed on Aug. 10, 2018.

(30) Foreign Application Priority Data

Aug. 11, 2017 (CN) .......................... 201710687719.0

(51) Int. Cl.
*H04W 72/12* (2009.01)
*H04W 28/02* (2009.01)
(Continued)

(52) U.S. Cl.
CPC ... *H04W 72/1268* (2013.01); *H04W 28/0278* (2013.01); *H04W 72/10* (2013.01); *H04W 74/0833* (2013.01)

(58) Field of Classification Search
CPC ......... H04W 72/1268; H04W 28/0278; H04W 72/10; H04W 74/0833
See application file for complete search history.

(56) References Cited

U.S. PATENT DOCUMENTS

2009/0113086 A1 4/2009 Wu et al.
2012/0093128 A1 4/2012 Song et al.
(Continued)

FOREIGN PATENT DOCUMENTS

CN 101426270 A 5/2009
CN 101562894 A 10/2009
(Continued)

OTHER PUBLICATIONS

"Consideration on multiple SR configuralions," 3GPP TSG-RAN WG2 Meeting NR Ad-hoc #2, Qingdao, China, R2-1706932, Total 4 pages, 3rd Generation Partnership Project, Valbonne, France (Jun. 27-29, 2017).

(Continued)

*Primary Examiner* — Dinh Nguyen
(74) *Attorney, Agent, or Firm* — Leydig, Voit & Mayer, Ltd.

(57) ABSTRACT

A communication method is provided. In the method, if a first logical channel of a terminal device does not have an uplink resource for carrying a scheduling request (SR) and the terminal device is in a first SR state, remaining, by the terminal device, in the first SR state and/or a first buffer status report (BSR) state until data of the first logical channel and/or a BSR are/is sent, where the BSR is used to indicate buffer status information of a logical channel group including the first logical channel. When a logical channel of the terminal device does not have an uplink resource for carrying the scheduling request, a problem that the terminal device cannot obtain an uplink transmission resource can be resolved.

12 Claims, 11 Drawing Sheets

(51) Int. Cl.
  *H04W 72/10* (2009.01)
  *H04W 74/08* (2009.01)

(56) References Cited

U.S. PATENT DOCUMENTS

| | | | | |
|---|---|---|---|---|
| 2015/0181618 A1* | 6/2015 | Yang | ...................... | H04L 69/03 370/329 |
| 2015/0230235 A1 | 8/2015 | Uchino et al. | | |
| 2016/0345352 A1* | 11/2016 | Langereis | ................ | H04B 1/40 |
| 2018/0139653 A1* | 5/2018 | Lee | ................... | H04W 28/0231 |

FOREIGN PATENT DOCUMENTS

| | | |
|---|---|---|
| CN | 101932052 A | 12/2010 |
| CN | 102271417 A | 12/2011 |
| CN | 103327536 A | 9/2013 |
| CN | 104604317 A | 5/2015 |
| CN | 105873227 A | 8/2016 |
| EP | 2432290 B1 | 5/2013 |
| WO | 03043251 A2 | 5/2003 |
| WO | 2010043963 A1 | 4/2010 |

OTHER PUBLICATIONS

"Enhanced SR in NR," 3GPP TSG-RAN WG2 NR Ad Hoc, Qingdao, China, R2-1707072 (revision of R2-1704589), Total 3 pages, 3rd Generation Partnership Project, Valbonne, France (Jun. 27-29, 2017).

"UE behaviour with none SR Configuralion," 3GPP TSG-RAN2 Meeting #99, Berlin, Germany, R2-1708267, pp. 1-4, 3rd Generation Partnership Project, Valbonne, France (Aug. 21-25, 2017).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.3.0, pp. 1-745, 3rd Generation Partnership Project, Valbonne, France (Jun. 2017).

"3rd Generation Partnership Project; Technical Specification Group Radio Access Network; Evolved Universal Terrestrial Radio Access (E-UTRA); Medium Access Conlrol (MAC) protocol specification (Release 14)," 3GPP TS 36.321 V14.3.0, pp. 1-107, 3rd Generation Partnership Project, Valbonne, France (Jun. 2017).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.3.0, pp. 1-331, 3rd Generation Partnership Project, Valbonne, France (Jun. 2017).

"3rd Generation Partnership Project; Technical Specification Group Radio Access Network; NR; Radio Resource Control (RRC); Protocol specification (Release 15)," 3GPP TS 38.331 V0.0.4, pp. 1-22, 3rd Generation Partnership Project, Valbonne, France (Jun. 2017).

"3rd Generation Partnership Project; Technical Specification Group Radio Access Network; NR; Medium Access Control (MAC) protocol specification (Release 15)," 3GPP TS 38.321 V0.2.0, pp. 1-36, 3rd Generation Partnership Project, Valbonne, France (Aug. 2017).

"Correction on SR triggering," 3GPP TSG-RAN WG2 Meeting #99, R2-1709351, Berlin, Germany, Total 3 pages, 3rd Generation Partnership Project, Valbonne, France (Aug. 21-25, 2017).

* cited by examiner

S210. If a first logical channel of a terminal device does not have an uplink resource for carrying a scheduling request and the terminal device is in a first scheduling request (SR) state, the terminal device remains in the first SR state or a first buffer status report (BSR) state until data of the first logical channel or a buffer status report (BSR) is sent, where the BSR is used to indicate buffer status information of a logical channel group including the first logical channel S220. If the data of the first logical channel or the buffer status report (BSR) is sent, the terminal device cancels the first SR state or the first BSR state

FIG. 2

S310. If a first logical channel of a terminal device does not have an uplink resource for carrying a scheduling request and the terminal device is in a first buffer status report (BSR) state, the terminal device remains in the first BSR state until data of the first logical channel or a buffer status report (BSR) is sent, where the BSR is used to indicate buffer status information of a logical channel group including the first logical channel S320. If the data of the first logical channel or the buffer status report (BSR) is sent, the terminal device cancels the first BSR state

FIG. 3

S410. If a first logical channel of a terminal device does not have an uplink resource for carrying a scheduling request and the terminal device is in a first SR state, the terminal device sends a scheduling request triggered by the first logical channel to a network device based on first scheduling request configuration of a second logical channel

FIG. 4

S510. If a first logical channel of a terminal device does not have an uplink resource for carrying a scheduling request and the terminal device is in a first scheduling request state, the terminal device sends a random access request message of the first logical channel to a network device based on first random access request configuration of the first logical channel, and cancels the first scheduling request state

FIG. 5

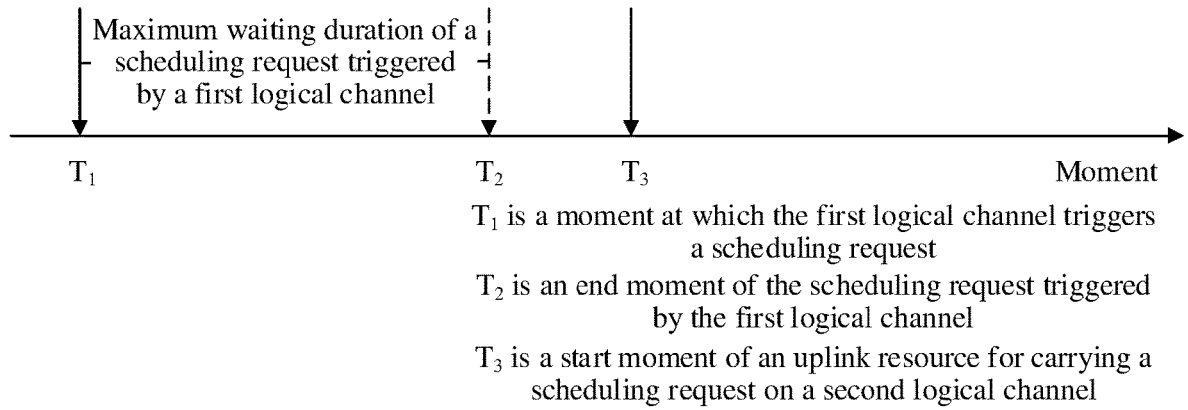

FIG. 9

S910. When a first timer expires, if at least one logical channel of a terminal device has a data transmission requirement, the terminal device sends a scheduling request to a network device based on scheduling request configuration of a first logical channel, where the first logical channel is a logical channel that has the scheduling request configuration in the plurality of logical channels

FIG. 10

S1010. A terminal device determines not to trigger a scheduling request when the terminal device receives radio resource control RRC signaling from a network device and the terminal device triggers a buffer status report BSR, where the radio resource control RRC signaling carries first indication information; or
a terminal device determines not to trigger a scheduling request when the terminal device does not receive radio resource control RRC signaling from a network device and the terminal device triggers a buffer status report BSR, where the radio resource control RRC signaling carries first indication information, and the first indication information indicates an uplink resource allocated by the network device to the terminal device

FIG. 11

COMMUNICATION METHOD AND COMMUNICATIONS APPARATUS

CROSS-REFERENCE TO RELATED APPLICATIONS

This application is a continuation of International Application No. PCT/CN2018/100082, filed on Aug. 10, 2018, which claims priority to Chinese Patent Application No. 201710687719.0, filed on Aug. 11, 2017. The disclosures of the aforementioned applications are hereby incorporated by reference in their entireties

TECHNICAL FIELD

Embodiments of this application relate to the communications field, and more specifically, to a communication method and a communications apparatus.

BACKGROUND

Currently, multiple air interface formats and multiple transmission time intervals (TTI) are introduced into a 5G system. In order to distinguish the multiple air interface formats and the multiple transmission time intervals, at least one scheduling request resource is configured for user equipment (UE), and each logical channel of the UE corresponds to at least one scheduling request resource. That is to say, when the UE sends a scheduling request (SR) message to a network device on a specific scheduling request resource, it indicates that the UE requests the network device to allocate an uplink resource with a specific air interface format and with a specific TTI length.

However, for a plurality of logical channels corresponding to the UE, when the UE has a data transmission requirement on a logical channel, if currently the logical channel does not have a resource for carrying the scheduling request message, the UE cannot request an uplink transmission resource for to-be-transmitted data on the logical channel.

SUMMARY

This application provides a communication method and a communications apparatus, so that when a logical channel of a terminal device does not have an uplink resource for carrying a scheduling request, a problem that the terminal device cannot obtain an uplink transmission resource can be resolved.

According to a first aspect, a communication method is provided. The method includes: if a first logical channel of a terminal device does not have an uplink resource for carrying a scheduling request and the terminal device is in a first scheduling request (SR) state, remaining, by the terminal device, in the first scheduling request (SR) state and/or a first buffer status report (BSR) state until data of the first logical channel and/or a buffer status report (BSR) are/is sent, where the buffer status report (BSR) is used to indicate buffer status information of a logical channel group including the first logical channel, the first buffer status report (BSR) state indicates that the buffer status report of the terminal device is triggered by the first logical channel and is not canceled, and the first scheduling request (SR) state indicates that the scheduling request is triggered by the first logical channel and is not canceled.

When the first logical channel of the terminal device does not have the uplink resource for carrying the scheduling request and the terminal device is in the first scheduling request (SR) state, the terminal device does not trigger a random access request process, to reduce an unnecessary random access request process, reduce a probability that a collision occurs due to the unnecessary random access request, and save energy for the terminal device.

With reference to the first aspect, in a possible implementation of the first aspect, the method further includes:
if the data of the first logical channel or the buffer status report (BSR) is sent, canceling, by the terminal device, the first scheduling request (SR) state and/or the first buffer status report (BSR) state.

Optionally, the data of the first logical channel and/or the buffer status report (BSR) are/is sent on a first uplink resource allocated to the terminal device, the first uplink resource is allocated based on a scheduling request that is triggered by a second logical channel and is sent, and the second logical channel is a logical channel that has scheduling request configuration and that corresponds to the terminal device.

According to a second aspect, a communication method is provided. The method includes: if a first logical channel of a terminal device does not have an uplink resource for carrying a scheduling request and the terminal device is in a first buffer status report (BSR) state, remaining, by the terminal device, in the first buffer status report (BSR) state until data of the first logical channel or a buffer status report (BSR) is sent, where the buffer status report (BSR) is used to indicate buffer status information of a logical channel group including the first logical channel, and the first buffer status report (BSR) state indicates that the buffer status report of the terminal device is triggered by the first logical channel and is not canceled.

When the first logical channel of the terminal device does not have the uplink resource for carrying the scheduling request and the terminal device is in the first buffer status report (BSR) state, the terminal device does not trigger a random access request process, to reduce an unnecessary random access request process, reduce a probability that a collision occurs due to the unnecessary random access request, and save energy for the terminal device.

With reference to the second aspect, in a possible implementation of the second aspect, the method further includes:
if the data of the first logical channel or the buffer status report (BSR) is sent, canceling, by the terminal device, the first buffer status report (BSR) state.

Optionally, the data of the first logical channel and/or the buffer status report (BSR) are/is sent on a first uplink resource allocated to the terminal device, the first uplink resource is allocated based on a scheduling request that is triggered by a second logical channel and is sent, and the second logical channel is a logical channel that has scheduling request configuration and that corresponds to the terminal device.

According to a third aspect, a communication method is provided. The method includes: if a first logical channel of a terminal device does not have an uplink resource for carrying a scheduling request and the terminal device is in a first scheduling request (SR) state, sending, by the terminal device, the scheduling request to a network device based on first scheduling request configuration of a second logical channel, where the first scheduling request (SR) state is used to indicate that the scheduling request is triggered by the first logical channel and is not canceled, and the first scheduling request configuration is used to send the scheduling request.

When the first logical channel of the terminal device does not have the uplink resource for carrying the scheduling request, the terminal device sends the scheduling request to the network device by using scheduling request configuration of another corresponding logical channel, to request an uplink transmission resource, to reduce an unnecessary random access request process, reduce a probability that a collision occurs due to the unnecessary random access request, and save energy for the terminal device. In this method, a waste of a resource can be reduced. In addition, the following problem can be solved: a throughput is reduced due to a limitation from a mapping relationship between a logical channel and an uplink resource.

When the first logical channel of the terminal device does not have the uplink resource for carrying the scheduling request, the terminal device notifies, in a random access request process, the network device of an air interface format of the uplink resource requested by the terminal device. In this way, the network device can allocate the uplink resource with the air interface format to the terminal device in time, to increase a data transmission rate and a throughput and reduce, to some extent, a probability that a collision occurs due to a random access.

With reference to the third aspect, in a possible implementation of the third aspect, a priority of the second logical channel is the same as that of the first logical channel; or the second logical channel is a logical channel with a highest priority in at least one logical channel, of the terminal device, having scheduling request configuration; or the second logical channel is a logical channel with a lowest priority in at least one logical channel, of the terminal device, having scheduling request configuration; or the second logical channel is a logical channel whose scheduling request resource corresponding to the scheduling request configuration arrives earliest in at least one logical channel, of the terminal device, having scheduling request configuration; or the second logical channel is a preconfigured logical channel of the terminal device.

With reference to the third aspect, in a possible implementation of the third aspect, the method further includes: if a first uplink resource can meet data of the first logical channel and data of a logical channel corresponding to the first uplink resource, canceling, by the terminal device, the first scheduling request (SR) state; or if a first uplink resource can meet data of the first logical channel, canceling, by the terminal device, the first scheduling request (SR) state, where the first uplink resource is an uplink resource that is allocated to the terminal device for data transmission.

With reference to the third aspect, in a possible implementation of the third aspect, the method further includes: determining, by the terminal device, that the first scheduling request configuration meets a first condition, where the first condition includes that a moment at which the scheduling request triggered by the first logical channel is sent based on the first scheduling request configuration meets a time requirement of the scheduling request triggered by the first logical channel; and/or a success probability of the scheduling request within a range of the time requirement is greater than or equal to a threshold, where the scheduling request is triggered by the first logical channel.

With reference to the third aspect, in a possible implementation of the third aspect, the method includes: That the first logical channel of the terminal device does not have the uplink resource for carrying the scheduling request is that the first logical channel does not have second scheduling request configuration; or the first logical channel has second scheduling request configuration but an uplink resource indicated by the second scheduling request configuration is released, where the second scheduling request configuration is used to send the scheduling request trigged by the first logical channel.

According to a fourth aspect, a communication method is provided. The method includes: if a first logical channel of a terminal device does not have an uplink resource for carrying a scheduling request and the terminal device is in a first scheduling request (SR) state, sending, by the terminal device, a random access request message to a network device based on first random access request configuration corresponding to the first logical channel, and canceling the first scheduling request state, where the first scheduling request (SR) state is used to indicate that the scheduling request is triggered by the first logical channel and is not canceled, and the first random access request configuration is used to send the random access request message.

When the first logical channel of the terminal device does not have the uplink resource for carrying the scheduling request, the terminal device notifies, in a random access request process, the network device of an air interface format of the uplink resource requested by the terminal device. In this way, the network device can allocate the uplink resource with the air interface format to the terminal device in time, to increase a data transmission rate and a throughput and reduce, to some extent, a probability that a collision occurs due to random access.

With reference to the fourth aspect, in a possible implementation of the fourth aspect, the sending, by the terminal device, a random access request message to a network device based on first random access request configuration of the first logical channel includes: sending, by the terminal device, the random access request message to the network device on a first time-frequency resource corresponding to the first random access request configuration and/or by using a preamble sequence corresponding to the random access request message, where the first time-frequency resource and/or the preamble sequence corresponding to the random access request message are/is used to instruct the network device to allocate an uplink resource with a first air interface format to the terminal device.

With reference to the fourth aspect, in a possible implementation of the fourth aspect, that the terminal device determines a first uplink resource when the first logical channel does not have the uplink resource for carrying the scheduling request includes that the terminal device determines the first uplink resource when the first logical channel does not have scheduling request resource configuration; or the terminal device determines the first uplink resource when the first logical channel has scheduling request resource configuration but an uplink resource corresponding to the scheduling request resource configuration is released.

According to a fifth aspect, a communication method is provided. The method includes: when a first timer expires, if at least one logical channel of a terminal device has a data transmission requirement, sending, by the terminal device, a scheduling request to a network device based on scheduling request configuration of a first logical channel, where the first logical channel is a logical channel that has scheduling request configuration in the plurality of logical channels, the scheduling request is used to request the network device to allocate a first uplink resource to the terminal device, and the first uplink resource is used to transmit data of the at least one logical channel and/or a buffer status report (BSR).

When the first timer expires, if a scheduling request is triggered, a problem that which scheduling request configuration is used by the terminal device to send the scheduling request to the network device is solved, and the uplink resource needed by the terminal device is requested by using the scheduling request, to further increase a data transmission rate and a throughput.

With reference to the fifth aspect, in a possible implementation of the fifth aspect, the first logical channel is a logical channel with a highest priority in a plurality of logical channels having scheduling request configuration; or the first logical channel is a logical channel with a lowest priority in a plurality of logical channels having scheduling request configuration; or the first logical channel is a logical channel whose scheduling request resource arrives earliest in a plurality of logical channels having scheduling request configuration; or the first logical channel is a preconfigured logical channel; or the first logical channel is a logical channel corresponding to a BSR that triggers the first timer to start or restart.

According to a sixth aspect, a communication method is provided. The method includes: determining, by a terminal device, not to trigger a scheduling request when the terminal device receives radio resource control (RRC) signaling from a network device and the terminal device triggers a buffer status report (BSR), where the radio resource control (RRC) signaling carries first indication information; or determining, by a terminal device, not to trigger a scheduling request when the terminal device does not receive radio resource control (RRC) signaling from a network device and the terminal device triggers a buffer status report (BSR), where the radio resource control (RRC) signaling carries first indication information, and the first indication information indicates an uplink resource that is allocated by the network device to the terminal device.

With reference to the sixth aspect, in a possible implementation of the sixth aspect, that the terminal device determines to trigger the scheduling request when the terminal device does not receive the first indication information carried in the radio resource control (RRC) signaling from the network device includes that the terminal device determines to trigger the scheduling request when the terminal device does not receive the first indication information carried in the radio resource control (RRC) signaling from the network device and a condition for triggering the scheduling request is met.

The uplink resource that is allocated by the network device to the terminal device is indicated to the terminal device by using the radio resource control (RRC) signaling. Therefore, when the terminal device triggers the buffer status report (BSR), the terminal device determines not to trigger the scheduling request, to save energy for the terminal device and reduce cell interference.

According to a seventh aspect, a communication method is provided. The method includes: receiving, by a terminal device, first indication information of a second base station from a first base station, where the first indication information is used to indicate a first uplink timing advance, and the first base station is different from the second base station; and determining, by the terminal device, the first uplink timing advance as a valid uplink timing advance.

The terminal device determines the first uplink timing advance, so that the terminal device sends first data to a network device based on the first uplink timing advance. The first data may be used to notify the second base station that handover is completed.

With reference to the seventh aspect, in a possible implementation of the seventh aspect, the determining, by the terminal device, the first uplink timing advance as a valid uplink timing advance includes: starting or restarting, by the terminal device, a first timer based on the first advance indication information; and determining, by the terminal device, the first uplink timing advance as the valid uplink timing advance during running of the first timer.

With reference to the seventh aspect, in a possible implementation of the seventh aspect, the method further includes: obtaining, by the terminal device, second indication information of the second base station, where the second indication information is used to indicate an allocated uplink transmission resource to the terminal device; and when the terminal device determines the first uplink timing advance as the valid uplink timing advance, sending, by the terminal device, first data to the second base station based on the second indication information of the second base station and the first uplink timing advance.

According to an eighth aspect, a terminal device is provided. The terminal device is configured to perform the communication method according to the first aspect or any possible implementation of the first aspect. Specifically, the terminal device may include a module configured to perform the communication method according to the first aspect or any possible implementation of the first aspect.

According to a ninth aspect, a terminal device is provided. The terminal device includes a memory and a processor. The memory is configured to store an instruction. The processor is configured to execute the instruction stored in the memory. The execution of the instruction stored in the memory enables the processor to perform the method according to the first aspect or a possible implementation of any aspect of the first aspect.

According to a tenth aspect, a computer-readable storage medium is provided. A computer program is stored in the computer-readable storage medium. The program is executed by a processor to perform the method according to the first aspect or a possible implementation of any aspect of the first aspect.

According to an eleventh aspect, a network device is provided. The network device is configured to perform the communication method according to the second aspect or any possible implementation of the second aspect. Specifically, the network device may include a module for performing the communication method according to the second aspect or any possible implementation of the second aspect.

According to a twelfth aspect, a network device is provided. The network device includes a memory and a processor. The memory is configured to store an instruction. The processor is configured to execute the instruction stored in the memory. The execution of the instruction stored in the memory enables the processor to perform the method according to the second aspect or a possible implementation of any aspect of the second aspect.

According to a thirteenth aspect, a computer-readable storage medium is provided. A computer program is stored in the computer-readable storage medium. The program is executed by a processor to perform the method according to the second aspect or a possible implementation of any aspect of the second aspect.

BRIEF DESCRIPTION OF DRAWINGS

FIG. 2 is a schematic flowchart of a communication method according to an embodiment of this application;

FIG. 3 is a schematic flowchart of another communication method according to an embodiment of this application;

FIG. 4 is a schematic flowchart of another communication method according to an embodiment of this application;

FIG. 5 is a schematic flowchart of another communication method according to an embodiment of this application;

FIG. 9 is a schematic diagram of a moment at which a scheduling request is sent in a communication method according to an embodiment of this application;

FIG. 10 is a schematic flowchart of another communication method according to an embodiment of this application;

FIG. 11 is a schematic flowchart of another communication method according to an embodiment of this application;

DESCRIPTION OF EMBODIMENTS

The following describes technical solutions in this application with reference to the accompanying drawings.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in the embodiments of this application may be referred to as user equipment, an access terminal, a subscriber unit, a subscriber station, a mobile station, a mobile console, a remote station, a remote terminal, a mobile device, a user terminal, a terminal, a radio communications device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a future 5G network, a terminal device in a future evolved public land mobile network (PLMN), or the like. This is not limited in the embodiments of this application.

A network device in the embodiments of this application may be a device configured to communicate with a terminal device. The network device may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay station, an access point, an in-vehicle device, a wearable device, a network device in a future 5G network or a network device in a future evolved PLMN network, or the like. This is not limited in the embodiments of the present invention.

Figure 1:
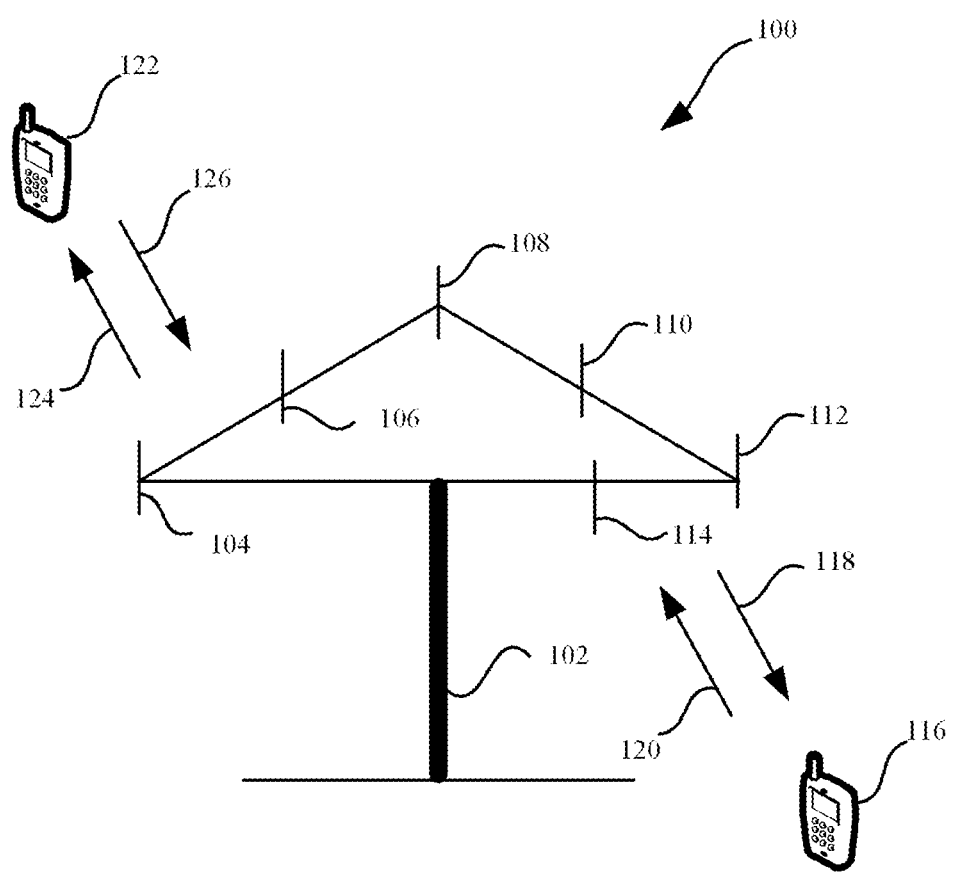
FIG. 1 is a schematic architectural diagram of a system according to an embodiment of this application.

FIG. 1 is a schematic diagram of a wireless communications system according to an embodiment of this application. As shown in FIG. 1, the communications system 100 includes a network device 102. The network device 102 may include one or more antennas, for example, antennas 104, 106, 108, 110, 112, and 114. In addition, the network device 102 may additionally include a transmitter chain and a receiver chain. A person of ordinary skill in the art may understand that the transmitter chain and the receiver chain may include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that, the network device 102 may communicate with any quantity of terminal devices similar to the terminal device 116 or the terminal device 122. The terminal devices 116 and 122 each may be, for example, a cellular phone, a smartphone, a portable computer, a handheld communications device, a handheld computing device, a satellite radio apparatus, a global positioning system, a PDA, and/or any other appropriate device configured to perform communication in the wireless communications system 100.

As shown in FIG. 1, the terminal device 116 communicates with the antennas 112 and 114. The antennas 112 and 114 send information to the terminal device 116 via a forward link (also referred to as a downlink) 118, and receive information from the terminal device 116 via a reverse link (also referred to as an uplink) 120. In addition, the terminal device 122 communicates with the antennas 104 and 106. The antennas 104 and 106 send information to the terminal device 122 via a forward link 124 and receive information from the terminal device 122 via a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or area that are/is designed for communication are/is referred to as a sector of the network device 102. For example, the antenna group may be designed to communicate with a terminal device in a sector in coverage of the network device 102. The network device may use a single antenna or a multi-antenna transmit diversity to send signals to all terminal devices in a corresponding sector. In a process in which the network device 102 communicates with the terminal devices 116 and 122 respectively via the forward links 118 and 124, transmit antennas of the network device 102 may use beamforming to increase signal-to-noise ratios of the forward links 118 and 124. In addition, compared with a manner in which the network device uses a single antenna or a multi-antenna transmit diversity to send signals to all terminal devices served by the network device, when the network device 102 uses beamforming to send signals to the terminal devices 116 and 122 that are randomly scattered in the related coverage area, interference to a mobile device that is in a neighboring cell is less.

At a specified time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits that need to be sent to the wireless communications receiving apparatus through a channel. The data bits may be included in a transport block (or a plurality of transport blocks) of data, and the transport block may be segmented to generate a plurality of code blocks.

In addition, the communications system 100 may be a PLMN network, a D2D network, an M2M network, or another network. FIG. 1 is only an example of a simplified schematic diagram. The network may further include another network device that is not shown in FIG. 1.

FIG. 2 is a schematic flowchart of a communication method 200 according to an embodiment of this application. In FIG. 2, a terminal device may be the terminal device 116 or 122 in FIG. 1, and a network device may be the network device 102 in FIG. 1. Certainly, a quantity of network devices and a quantity of terminal devices in an actual system may not be limited to an example given in this embodiment or other embodiments, and details are not described again below. The method 200 includes at least the following steps.

S210. If a first logical channel of the terminal device does not have an uplink resource for carrying a scheduling request and the terminal device is in a first scheduling request (SR) state, the terminal device remains in the first scheduling request (SR) state or a first buffer status report (BSR) state until data of the first logical channel and/or a buffer status report (BSR) are/is sent, where the buffer status report (BSR) is used to indicate buffer status information of a logical channel group including the first logical channel.

The first buffer status report (BSR) state indicates that the buffer status report of the terminal device is triggered by the first logical channel and is not canceled, and the first scheduling request (SR) state indicates that a scheduling request is triggered by the first logical channel and is not canceled.

Specifically, the terminal device has an uplink data transmission requirement on a logical channel (for example, the first logical channel) corresponding to the terminal device. However, the first logical channel does not have the uplink resource for carrying the scheduling request. The terminal device triggers the buffer status report (BSR), and then further triggers a scheduling request (SR). The terminal device does not send the scheduling request (SR) or the buffer status report (BSR) to the network device, and remains in a to-be-sent state of the scheduling request (SR) (for example, the first scheduling request (SR) state) and/or a to-be-sent state of the buffer status report (BSR) (for example, the first buffer status report (BSR) state).

Optionally, if the data of the first logical channel and/or the buffer status report (BSR) are/is sent, the terminal device cancels the first scheduling request (SR) state and/or the first buffer status report (BSR) state.

Specifically, when the data of the first logical channel or the buffer status report (BSR) is sent to the network device, the terminal device cancels the first SR state and/or the first BSR state.

Optionally, the data of the first logical channel or the buffer status report (BSR) is sent on a first uplink resource allocated to the terminal device, the first uplink resource is allocated based on a scheduling request that is triggered by a second logical channel and is sent by the terminal device, and the second logical channel is a logical channel that has scheduling request configuration and that corresponds to the terminal device.

Specifically, a resource (for example, the first uplink resource) that is used to send the data of the first logical channel to the network device may be an uplink resource that is allocated by the network device based on a scheduling request sent by the terminal device, where the scheduling request is triggered by another logical channel (for example, the second logical channel) that meets a requirement, has scheduling request configuration, and corresponds to the terminal device.

It should be noted that, that the requirement is met means that an air interface format of the uplink resource that is obtained through requesting by sending a scheduling request message based on the scheduling request configuration of the logical channel meets a requirement of the data of the first logical channel.

A resource (for example, the first uplink resource) that is used to send, to the network device, a buffer status report (BSR) indicating the buffer status information of the logical channel group including the first logical channel may be an uplink resource that is allocated by the network device based on a scheduling request sent by the terminal device, where the scheduling request is triggered by any other logical channel (for example, the second logical channel) that has scheduling request configuration and corresponds to the terminal device.

For example, the terminal device sends a scheduling request to the network device based on scheduling request configuration of the second logical channel, and the network device allocates the uplink resource to the terminal device based on the scheduling request.

It should be noted that, that the terminal device remains in the first scheduling request (SR) state and/or the first buffer status report (BSR) state means that the terminal device does not initiate a random access request process to the network device for requesting an uplink resource.

It should be noted that the first logical channel that does not have the uplink resource for carrying the scheduling request may trigger the first scheduling request (SR) state, but the SR is not sent.

When the first logical channel of the terminal device does not have the uplink resource for carrying the scheduling request and the terminal device is in the first scheduling request (SR) state, the terminal device does not trigger a random access request process, to reduce an unnecessary random access request process, reduce a probability that a collision occurs due to the unnecessary random access request, and save energy for the terminal device.

FIG. 3 is a schematic flowchart of a communication method 300 according to an embodiment of this application. The method 300 includes at least the following steps.

S310. If a first logical channel of a terminal device does not have an uplink resource for carrying a scheduling request and the terminal device is in a first buffer status report (BSR) state, the terminal device remains in the first buffer status report (BSR) state until data of the first logical channel and/or a buffer status report (BSR) are/is sent, where the buffer status report (BSR) is used to indicate buffer status information of a logical channel group including the first logical channel.

The first buffer status report (BSR) state indicates that the buffer status report of the terminal device is triggered by the first logical channel and is not canceled.

Specifically, the terminal device has an uplink data transmission requirement on a logical channel (for example, the first logical channel) corresponding to the terminal device. However, the first logical channel does not have the uplink resource for carrying the scheduling request. On the first logical channel, the terminal device triggers the buffer status report (BSR) but does not trigger a scheduling request (SR). The terminal device does not send the buffer status report (BSR) to a network device, and remains in a to-be-sent state of the buffer status report (BSR) (for example, the first buffer status report (BSR) state).

Optionally, in step S320, if the data of the first logical channel and/or the buffer status report (BSR) are/is sent, the terminal device cancels the first buffer status report (BSR) state.

Specifically, when the data of the first logical channel and/or the buffer status report (BSR) are/is sent to the network device, the terminal device cancels the first buffer status report (BSR) state.

Optionally, the data of the first logical channel and/or the buffer status report (BSR) are/is sent on a first uplink resource allocated to the terminal device, the first uplink resource is allocated based on a scheduling request sent by the terminal device, wherein the scheduling request is triggered by a second logical channel that has scheduling request configuration and corresponds to the terminal device.

Specifically, a resource (for example, the first uplink resource) that is used to send the data of the first logical channel to the network device may be an uplink resource that is allocated by the network device based on a scheduling request sent by the terminal device, where the scheduling request is triggered by another logical channel (for example, the second logical channel) that meets a requirement, has scheduling request configuration, and corresponds to the terminal device.

It should be noted that, that the requirement is met means that an air interface format of the uplink resource that is obtained through requesting by sending a scheduling request message based on the scheduling request configuration of the logical channel meets a requirement of the data of the first logical channel. A resource (for example, the first uplink resource) that is used to send, to the network device, a buffer status report (BSR) indicating the buffer status information of the logical channel group including the first logical channel may be an uplink resource that is allocated by the network device based on a scheduling request sent by the terminal device, where the scheduling request is triggered by any other logical channel (for example, the second logical channel) that has scheduling request configuration and corresponds to the terminal device.

For example, the terminal device sends a scheduling request to the network device based on scheduling request configuration of the second logical channel, and the network device allocates the uplink resource to the terminal device based on the scheduling request.

It should be noted that, that the terminal device remains in the first buffer status report (BSR) state means that the terminal device does not initiate a random access request process to the network device for requesting an uplink resource.

It should be noted that the first logical channel that does not have the uplink resource for carrying the scheduling request does not trigger the first scheduling request (SR) state.

When the first logical channel of the terminal device does not have the uplink resource for carrying the scheduling request and the terminal device is in the first scheduling request (SR) state, the terminal device does not trigger a random access request process, to reduce an unnecessary random access request process, reduce a probability that a collision occurs due to the unnecessary random access request, and save energy for the terminal device.

FIG. 4 is a schematic flowchart of a communication method 400 according to an embodiment of this application. The method 400 includes at least the following step.

S410. If a first logical channel of a terminal device does not have an uplink resource for carrying a scheduling request and the terminal device is in a first scheduling request (SR) state, the terminal device sends the scheduling request to a network device based on first scheduling request configuration of a second logical channel.

The first scheduling request (SR) state indicates that the scheduling request is triggered by the first logical channel and is not canceled, and the first scheduling request configuration is used to send the scheduling request triggered by the second logical channel.

Specifically, the terminal device has an uplink data transmission requirement on a logical channel (for example, the first logical channel) corresponding to the terminal device. However, the first logical channel does not have the uplink resource for carrying the scheduling request. The terminal device triggers a buffer status report (BSR), and further triggers a scheduling request (SR) when a condition is met. In this case, the terminal device may select a logical channel from other logical channels that correspond to the terminal device and have scheduling request configuration, and send the scheduling request to the network device based on scheduling request configuration (for example, the first scheduling request configuration) of the logical channel (for example, the second logical channel).

In step S410, the terminal device may select a logical channel (for example, the second logical channel) from other logical channels that correspond to the terminal device and have scheduling request configuration, and send the scheduling request to the network device based on scheduling request configuration of the logical channel.

Optionally, the second logical channel is any logical channel with a same priority as the first logical channel; or the second logical channel is a logical channel with a highest priority in a plurality of logical channels having scheduling request configuration; or the second logical channel is a logical channel with a lowest priority in a plurality of logical channels having scheduling request configuration; or the second logical channel is a logical channel whose scheduling request resource arrives earliest in a plurality of logical channels having scheduling request configuration.

In this application, the terminal device may send the scheduling request to the network device based on preconfigured scheduling request configuration. For example, when the first logical channel has an uplink data transmission requirement but the first logical channel does not have the uplink resource for carrying the scheduling request, the terminal device may send the scheduling request based on the preconfigured scheduling request configuration.

When the terminal device has the uplink data transmission requirement on the first logical channel, the terminal device triggers the buffer status report (BSR), and then triggers the scheduling request (SR) when the condition is met. Because the first logical channel does not have the scheduling request configuration, the scheduling request triggered by the first logical channel is not sent out but is in a to-be-sent state (for example, the first scheduling request (SR) state, where the first scheduling request (SR) state indicates that the scheduling request is triggered by the first logical channel and is not canceled).

The following describes a method for canceling the first scheduling request (SR) state in this application.

Method 1

For example, the terminal device sends the scheduling request to the network device based on the first scheduling request configuration of the second logical channel, and the scheduling request is used to request the network device to allocate the uplink resource. When the terminal device receives the uplink resource (for example, a first uplink resource) allocated by the network device to the terminal device, the terminal device determines whether the first uplink resource can meet data corresponding to the first logical channel and data on a logical channel corresponding to the first uplink resource. For example, the terminal device determines whether a size of the first uplink resource can enable the data corresponding to the first logical channel and the data of the logical channel corresponding to the first uplink resource to be all transmitted. If the first uplink resource can meet the foregoing requirement, the terminal device cancels the first scheduling request (SR) state.

It should be noted that the logical channel corresponding to the first uplink resource means all logical channels that can use the first uplink resource to transmit data and that correspond to the terminal device.

Method 2

Because a first uplink resource is an uplink resource that is requested by the terminal device by using the scheduling request triggered by the first logical channel, the terminal device cancels the first scheduling request (SR) state when the terminal device determines that the first uplink resource can be used to transmit all the data corresponding to the first logical channel.

As an example instead of a limitation, when the first uplink resource includes uplink resources with two formats, the first logical channel may be used to transmit data by using a resource with a first format in the two formats, or may be used to transmit data by using a resource with a second format in the two formats. The second logical channel may be used to transmit data only by using a resource with the second format in the two formats.

To avoid a waste of a resource, the data corresponding to the first logical channel is first transmitted by using the resource with the first format, and then the data corresponding to the second logical channel and remaining data obtained after transmission is performed by using the resource with the first format on the first logical channel are transmitted by using the resource with the second format.

When the first logical channel of the terminal device does not have the uplink resource for carrying the scheduling request, the terminal device sends the scheduling request to the network device by using scheduling request configuration of another logical channel corresponding to the terminal device, to request an uplink transmission resource, to reduce an unnecessary random access request process, reduce a probability that a collision occurs due to the unnecessary random access request, and save energy for the terminal device. In this method, a waste of a resource can be reduced. In addition, the following problem can be solved: a throughput is reduced due to a limitation from a mapping relationship between a logical channel and an uplink resource.

FIG. 5 is a schematic flowchart of a communication method 500 according to an embodiment of this application. The method 500 includes at least the following step.

S510. If a first logical channel of a terminal device does not have an uplink resource for carrying a scheduling request and the terminal device is in a first scheduling request (SR) state, the terminal device sends a random access request message to a network device based on first random access request configuration of the first logical channel, and cancels the first scheduling request (SR) state.

The first scheduling request (SR) state indicates that the scheduling request is triggered by the first logical channel and is not canceled, and the first random access request configuration is used to send the random access request message.

Specifically, when the terminal device has an uplink data transmission requirement on the first logical channel and the first logical channel does not have the uplink resource for carrying the scheduling request, in this case, the terminal device sends the random access request message to the network device based on the random access request configuration corresponding to the first logical channel (for example, the first random access request configuration).

It should be noted that, for a plurality of logical channels corresponding to the terminal device, random access request configuration corresponding to any two different logical channels may indicate different uplink resources for carrying the random access request message; or some of the plurality of logical channels may correspond to a same resource for carrying the random access request message. This is not specifically limited in this application.

Optionally, the terminal device sends the random access request message to the network device on a first time-frequency resource corresponding to the first random access request configuration and/or by using a corresponding preamble sequence. The first time-frequency resource and/or the corresponding preamble sequence for sending the random access request message are/is used to instruct the network device to allocate an uplink resource with a first air interface format to the terminal device.

Specifically, a correspondence between an air interface format of the uplink resource requested by using the random access request message, and the corresponding preamble sequence for sending the random access request message and/or the time-frequency resource for carrying the random access request message is determined based on the first random access request configuration.

When the first logical channel of the terminal device does not have the uplink resource for carrying the scheduling request, the terminal device notifies, in a random access request process, the network device of the air interface format of the uplink resource requested by the terminal device. In this way, the network device can allocate the uplink resource with the air interface format to the terminal device in time, to increase a data transmission rate and a throughput and reduce, to some extent, a probability that a collision occurs due to random access.

Figure 6:
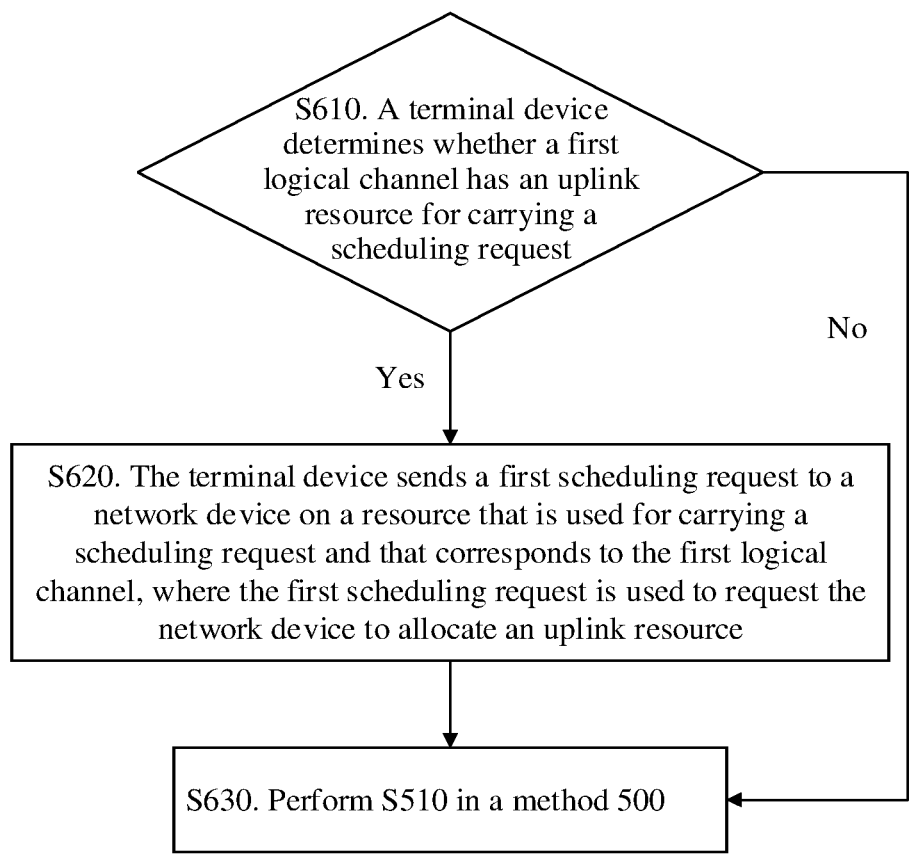
FIG. 6 is a schematic flowchart of another communication method according to an embodiment of this application.

In this application, the method 400 and the method 500 may be combined. The following separately describes combined methods 600, 700, and 800. As shown in FIG. 6, the method 600 includes at least the following steps.

S610. A terminal device determines whether a first logical channel has an uplink resource for carrying a scheduling request.

Specifically, when the terminal device determines that the first logical channel has the uplink resource for carrying the scheduling request, the terminal device performs step S620; otherwise, the terminal device performs step S630.

S620. The terminal device sends a first scheduling request to a network device on a resource that is used for carrying a scheduling request message and that corresponds to the first logical channel, where the first scheduling request is used to request the network device to allocate an uplink resource.

S630. Perform S510 in the method 500.

In this method, an air interface format of the uplink resource requested by UE may be indicated to a base station in a random access process. In this way, the base station may allocate the uplink resource with the air interface format in time, to increase a data transmission rate and a throughput. In addition, a probability that a collision occurs due to random access may be reduced to some extent.

Figure 7:
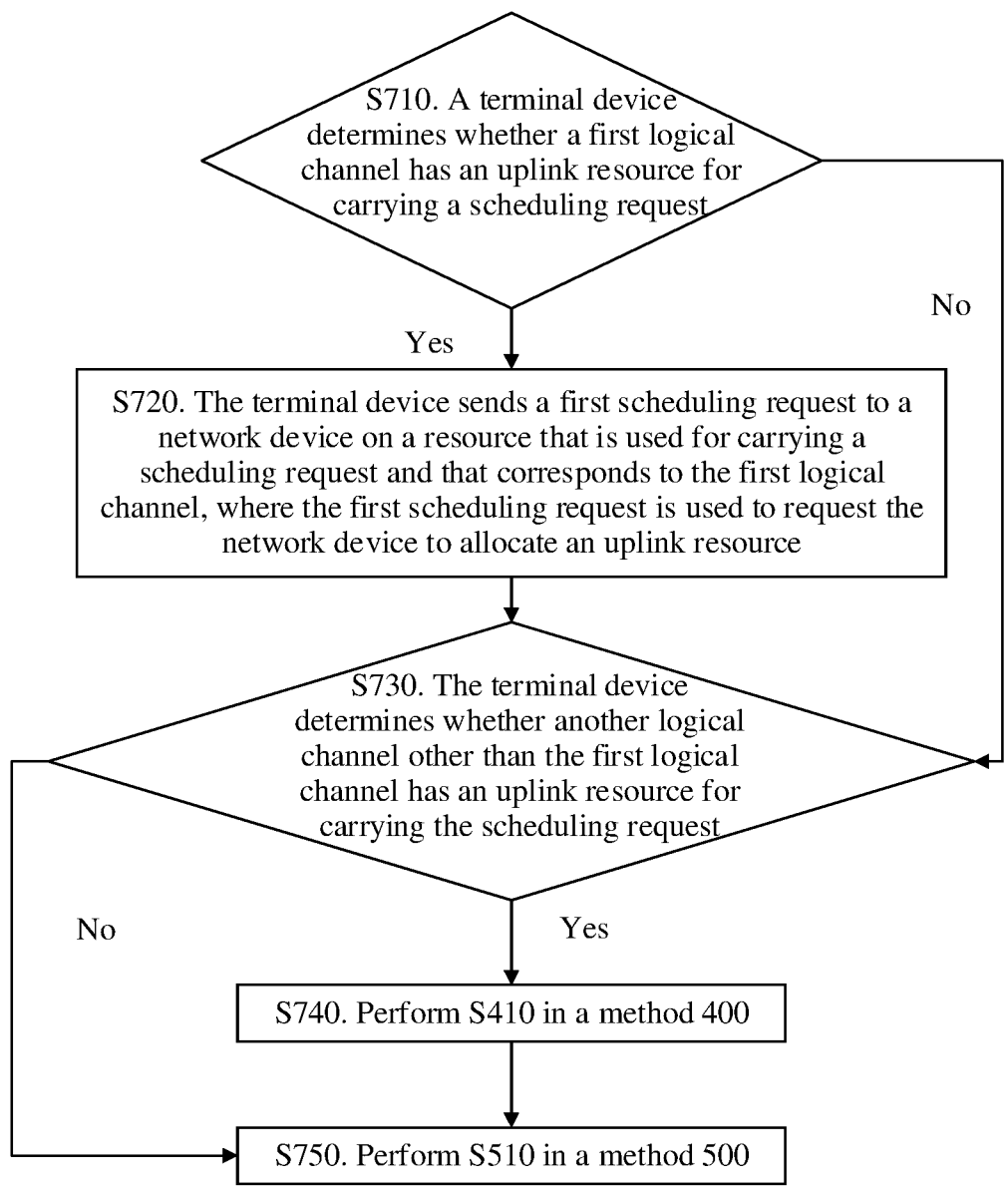
FIG. 7 is a schematic flowchart of another communication method according to an embodiment of this application.

As shown in FIG. 7, the method 700 includes at least the following steps.

S710. A terminal device determines whether a first logical channel has an uplink resource for carrying a scheduling request.

Specifically, when the terminal device determines that the first logical channel has the uplink resource for carrying the scheduling request, the terminal device performs step S720; otherwise, the terminal device performs step S730.

S720. The terminal device sends a first scheduling request to a network device on a resource that is used for carrying a scheduling request message and that corresponds to the first logical channel, where the first scheduling request is used to request the network device to allocate an uplink resource.

S730. The terminal device determines whether another logical channel other than the first logical channel has an uplink resource for carrying the scheduling request.

Specifically, when the first logical channel does not have the uplink resource for carrying the scheduling request, the terminal device continues to determine whether another logical channel (for example, a second logical channel) has the uplink resource for carrying the scheduling request. If the terminal device determines that the second logical channel has the uplink resource for carrying the scheduling request, the terminal device performs S740; otherwise, the terminal device performs S750.

S740. Perform S410 in the method 400.

In this method, an unnecessary random access request process can be reduced, a probability that a collision occurs due to the unnecessary random access request can be reduced, and energy of UE can be saved. In this method, a resource is not wasted. In addition, the following problem is solved: a throughput is reduced due to a limitation from a mapping relationship between a logical channel and an uplink resource.

S750. Perform S510 in the method 500.

In this method, an air interface format of the uplink resource requested by UE may be indicated to a base station in a random access process. In this way, the base station may allocate the uplink resource with the air interface format in time, to increase a data transmission rate and a throughput. In addition, a probability that a collision occurs due to random access may be reduced to some extent.

Figure 8:
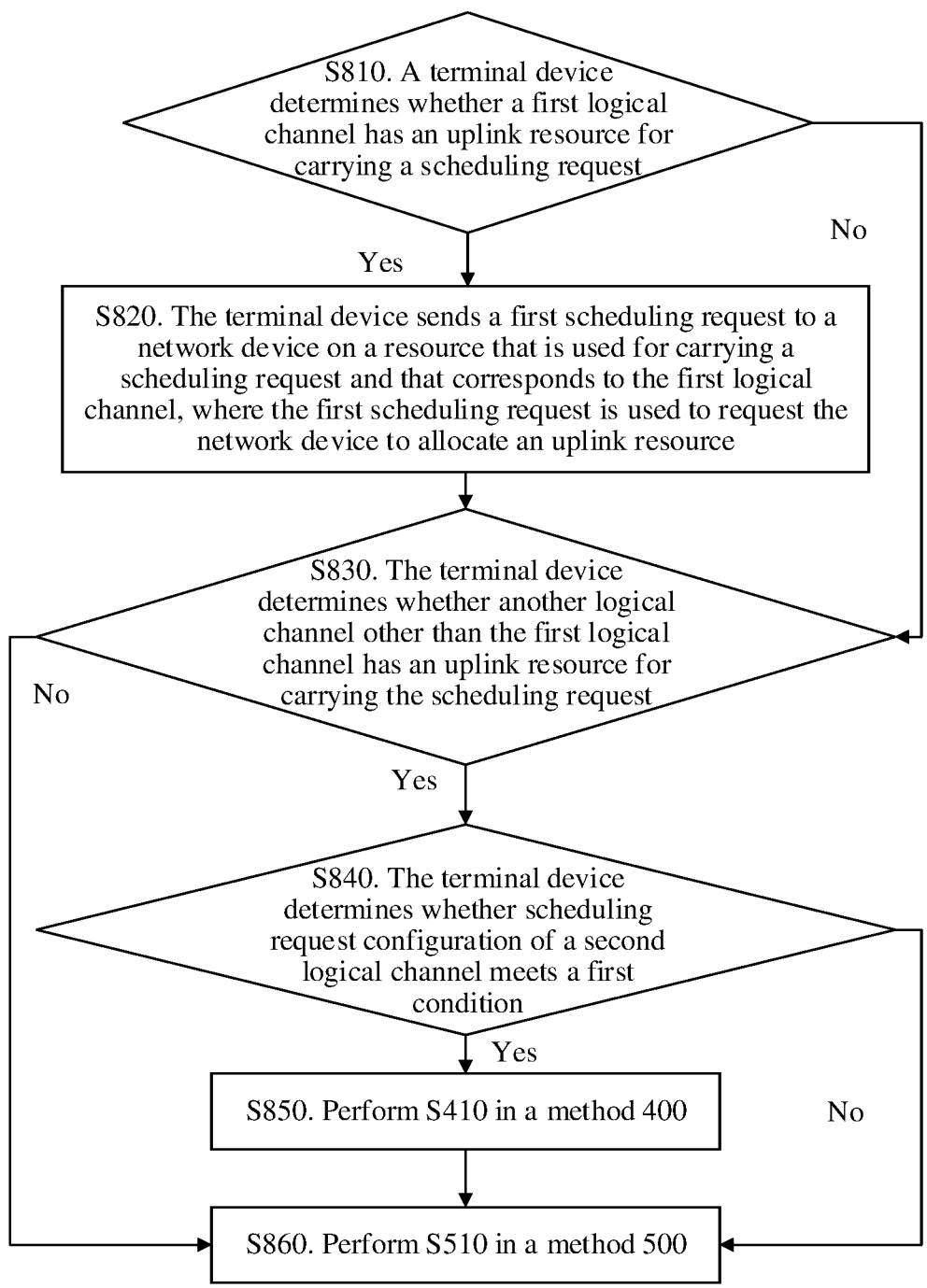
FIG. 8 is a schematic flowchart of another communication method according to an embodiment of this application.

As shown in FIG. 8, the method 800 includes at least the following steps.

S810. A terminal device determines whether a first logical channel has an uplink resource for carrying a scheduling request.

Specifically, when the terminal device determines that the first logical channel has the uplink resource for carrying the scheduling request, the terminal device performs step S820; otherwise, the terminal device performs step S830.

S820. The terminal device sends a first scheduling request to a network device on a resource that is used for carrying a scheduling request message and that corresponds to the first logical channel, where the first scheduling request is used to request the network device to allocate an uplink resource.

S830. The terminal device determines whether another logical channel other than the first logical channel has an uplink resource for carrying the scheduling request.

Specifically, when the first logical channel does not have the uplink resource for carrying the scheduling request, the terminal device continues to determine whether another logical channel (for example, a second logical channel) has the uplink resource for carrying the scheduling request. If the terminal device determines that the second logical channel has the uplink resource for carrying the scheduling request, the terminal device performs S840; otherwise, the terminal device performs S850.

S840. The terminal device determines whether scheduling request configuration of the second logical channel meets a first condition, where the first condition includes that a moment at which the scheduling request triggered by the first logical channel is sent based on the first scheduling request configuration meets a time requirement of the scheduling request triggered by the first logical channel; and/or a success probability of the scheduling request triggered by the first logical channel within a range of the time requirement is greater than or equal to a preset threshold.

Specifically, when the terminal device sends the scheduling request triggered by the first logical channel to the network device based on the scheduling request configuration of the second logical channel, the terminal device first determines whether the scheduling request configuration of the second logical channel meets the first condition.

As an example instead of a limitation, as shown in FIG. 9, the first logical channel triggers the scheduling request at a moment $T_1$, and maximum waiting duration of the scheduling request can only reach a $T_2$ moment. It can be learned from FIG. 9 that the uplink resource corresponding to the scheduling request configuration of the second logical channel can be used to send the scheduling request triggered by the first logical channel only when a $T_3$ moment is reached. In this case, the terminal device determines that the scheduling request configuration of the second logical channel does not meet the first condition.

The maximum waiting duration of the scheduling request shown in FIG. 9 may be configured by the network device. Maximum waiting duration of a scheduling request may be configured for each logical channel corresponding to the terminal device, or maximum waiting duration of a scheduling request may be configured for a logical channel group corresponding to the terminal device. This is not limited in this application.

In addition, the terminal device may determine whether a success probability of the uplink resource corresponding to the scheduling request configuration of the second logical channel is greater than or equal to a preset threshold.

The terminal device may determine, based on a quantity of times that the scheduling request can be correspondingly sent within the maximum waiting duration of the scheduling request, whether the uplink resource corresponding to the scheduling request configuration of the second logical channel meets the first condition.

When scheduling request configuration is configured for each logical channel corresponding to the terminal device, a corresponding success probability is correspondingly configured for the scheduling request configuration corresponding to the logical channel. For example, a success probability of the uplink resource corresponding to the scheduling request configuration of the second logical channel is 90%, and an expected success probability of the scheduling request triggered byby the first logical channel is 99%. It can be learned that the success probability of the scheduling request corresponding to the second logical channel is less than the expected success probability of the scheduling request triggered byby the first logical channel. In this case, if there are at least two opportunities for sending a scheduling request with a success probability of 90% within the maximum waiting duration of the scheduling request triggered byby the first logical channel, and the scheduling request with the success probability of 90% is a scheduling request sent based on the scheduling request configuration of the second logical channel, the terminal device determines that the scheduling request configuration of the second logical channel meets the first condition.

In this case, when the terminal device determines that the scheduling request configuration of the second logical channel meets the first condition, the terminal device may perform S850; otherwise, the terminal device performs S860 in the method.

S850. Perform S410 in the method 400.

In this method, an unnecessary random access request process can be reduced, a probability that a collision occurs due to the unnecessary random access request can be reduced, and energy of UE can be saved. In this method, a resource is not wasted. In addition, the following problem is solved: a throughput is reduced due to a limitation from a mapping relationship between a logical channel and an uplink resource.

S860. Perform S510 in the method 500.

In this method, an air interface format of the uplink resource requested by UE may be indicated to a base station in a random access process. In this way, the base station may allocate the uplink resource with the air interface format in time, to increase a data transmission rate and a throughput. In addition, a probability that a collision occurs due to random access may be reduced to some extent.

In addition, the terminal device may request, in the following manner, the network device to allocate an uplink resource.

When the first logical channel of the terminal device has an uplink data transmission requirement but the terminal device does not have scheduling request configuration, the terminal device triggers a buffer status report (BSR), then further triggers the scheduling request (SR) when the condition is met, and starts a timer at the same time. During running of the timer, if the terminal device obtains a first uplink resource and the first uplink resource can be used to transmit all data buffered on the first logical channel, the terminal device cancels a to-be-sent state of the scheduling request triggered by the first logical channel, and stops the timer at the same time.

Alternatively, the first uplink resource may be used to transmit only partial data buffered on the first logical channel, and meanwhile the terminal device may report a buffer status report to the network device. The buffer status report (BSR) indicates buffer status information of a logical channel group including the first logical channel. In this case, the terminal device cancels the to-be-sent state of the scheduling request triggered by the first logical channel, and stops the timer at the same time.

Alternatively, the uplink resource may be used to transmit only partial data buffered on the first logical channel, and meanwhile the terminal device may report a buffer status report to the network device. The buffer status report (BSR) indicates partial buffer status information of a logical channel group including the first logical channel. In this case, the terminal device cancels the to-be-sent state of the scheduling request triggered by the first logical channel, and stops the timer at the same time.

Alternatively, when the timer expires, if the to-be-sent status of the scheduling request triggered by the first logical channel is still not canceled, in this case, the terminal device sends a random access request message to the network device, to request the network device to allocate an uplink resource to the terminal device.

In this method, whether to trigger a RACH to request an uplink resource is controlled by using a timer, to reduce an unnecessary random access request process, reduce a probability that a collision occurs due to the unnecessary random access request, and save energy for UE.

FIG. 10 is a schematic flowchart of a communication method 900 according to an embodiment of this application. As shown in FIG. 10, the method 900 includes at least the following step.

S910. When a first timer expires, if at least one logical channel of a terminal device has a data transmission requirement, the terminal device sends a scheduling request to a network device based on scheduling request configuration of a first logical channel, where the first logical channel is a logical channel that has scheduling request configuration in a plurality of logical channels, the scheduling request triggered by the first logical channel is used to request the network device to allocate a first uplink resource to the terminal device, and the first uplink resource is used to transmit data of the logical channel and/or a buffer status report (BSR).

Specifically, when the terminal device has an uplink data transmission requirement on a logical channel, the terminal device sends a buffer status report (BSR) to the network device. To avoid a case in which after sending the BSR, the terminal device does not receive, in a relatively long period of time, a resource allocated by the network device, after sending the BSR to the network device, the terminal device starts or restarts a timer (for example, the first timer), and when the timer expires, if at least one logical channel of any logical channel group of the terminal device has a data transmission requirement, the terminal device triggers a BSR again, and further triggers a scheduling request (SR) when a condition is met.

After the SR is triggered, a plurality of logical channels of the terminal device may have uplink data transmission requirements. In this case, the terminal device needs to determine a logical channel (for example, the first logical channel) from the plurality of logical channels, and send a scheduling request to the network device based on scheduling request configuration of the logical channel. The scheduling request is used to request the network device to allocate an uplink resource (for example, the first uplink resource) to the terminal device. The first uplink resource is used to transmit data of the at least one logical channel and/or a buffer status report (BSR).

Optionally, the first logical channel is a logical channel with a highest priority in a plurality of logical channels having scheduling request configuration; or the first logical channel is a logical channel with a lowest priority in a plurality of logical channels having scheduling request configuration; or the first logical channel is a logical channel whose scheduling request resource arrives earliest in a plurality of logical channels having scheduling request configuration; or the first logical channel is a preconfigured logical channel; or the first logical channel is a logical channel corresponding to a BSR that triggers the first timer to start or restart.

When the first timer expires, if a scheduling request is triggered, a problem that which scheduling request configuration is used by the terminal device to send the scheduling request to the network device is solved, and the uplink resource needed by the terminal device is requested by using the scheduling request, to further increase a data transmission rate and a throughput.

In the foregoing embodiment, the communication method provided in this embodiment of this application is described by using an example in which the first logical channel of the terminal device does not have scheduling request resource configuration. However, when the first logical channel has the scheduling request resource configuration and an uplink resource corresponding to the scheduling request resource configuration is not released, the terminal device may send a scheduling request message on the uplink resource corresponding to the scheduling request resource configuration for a plurality of times, but does not receive corresponding scheduling information. For example, the terminal device sends the scheduling request message on the uplink resource corresponding to first scheduling request resource configuration of the first logical channel. However, after a maximum quantity of request times is reached, the terminal device does not receive an uplink resource with an air interface format corresponding to the first logical channel.

The following describes operations of the terminal device after the scheduling request message is sent for the maximum quantity of times.

After the terminal device determines that a quantity of times of sending the scheduling request message on the uplink resource corresponding to the first scheduling request resource configuration of the first logical channel reaches the maximum quantity of times, the terminal device releases the first scheduling request resource configuration of the first logical channel.

In another implementation, after the terminal device determines that a quantity of times of sending the scheduling request message on the uplink resource corresponding to the first scheduling request resource configuration of the first logical channel reaches the maximum quantity of times, the terminal device releases the first scheduling request resource configuration of the first logical channel and all scheduling request resource configuration in a cell corresponding to the first scheduling request resource configuration.

Optionally, after the terminal device releases the first scheduling request resource configuration of the first logical channel, the terminal device notifies the network that the first scheduling request resource configuration of the first logical channel is released.

Optionally, after the terminal device releases the first scheduling request resource configuration of the first logical channel and all the scheduling request resource configuration in the cell corresponding to the first scheduling request resource configuration, the terminal device notifies the network that the first scheduling request resource configuration of the first logical channel and all the scheduling request resource configuration in the cell corresponding to the first scheduling request resource configuration are released.

In this method, when the SR is transmitted for the maximum quantity of times, a PUCCH resource of only a related cell is released, to prevent UE from erroneously releasing PUCCH resources of all cells.

FIG. 11 is a schematic flowchart of a communication method 1000 according to an embodiment of this application. As shown in FIG. 11, the method 1000 includes at least the following step.

S1010. A terminal device determines not to trigger a scheduling request when the terminal device receives radio resource control (RRC) signaling from a network device and the terminal device triggers a buffer status report (BSR), where the radio resource control (RRC) signaling carries first indication information; or a terminal device determines not to trigger a scheduling request when the terminal device does not receive radio resource control (RRC) signaling from a network device and the terminal device triggers a buffer status report (BSR), where the radio resource control (RRC) signaling carries first indication information, and the first indication information indicates an uplink resource allocated by the network device to the terminal device.

Specifically, when the terminal device receives the radio resource control (RRC) signaling from the network device, the RRC signaling carries the first indication information, and the first indication information indicates the uplink resource allocated by the network device to the terminal device, the terminal device determines, based on the first indication information, the uplink resource allocated by the network device to the terminal device. Therefore, when the terminal device triggers the buffer status report (BSR), the terminal device determines not to trigger the scheduling request.

Alternatively, when the terminal device does not receive the radio resource control (RRC) signaling from the network device, the terminal device cannot determine the uplink resource allocated by the network device to the terminal device. Therefore, when the terminal device triggers the buffer status report (BSR), the terminal device determines to trigger the scheduling request.

Optionally, that the terminal device determines to trigger the scheduling request when the terminal device does not receive the first indication information carried in the radio resource control (RRC) signaling from the network device includes that the terminal device determines to trigger the scheduling request when the terminal device does not receive the first indication information carried in the radio resource control (RRC) signaling from the network device and a condition for triggering the scheduling request is met.

Specifically, when the first indication information carried in the radio resource control (RRC) signaling is not received, the terminal device may trigger the scheduling request if the terminal device meets the condition for triggering the scheduling request, for example, another logical channel of the terminal device has an uplink resource for carrying the scheduling request.

The uplink resource that is allocated by the network device to the terminal device is indicated to the terminal device by using the radio resource control (RRC) signaling. Therefore, when the terminal device triggers the buffer status report (BSR), the terminal device determines not to trigger the scheduling request, to save energy for the terminal device and reduce cell interference.

Figure 12:
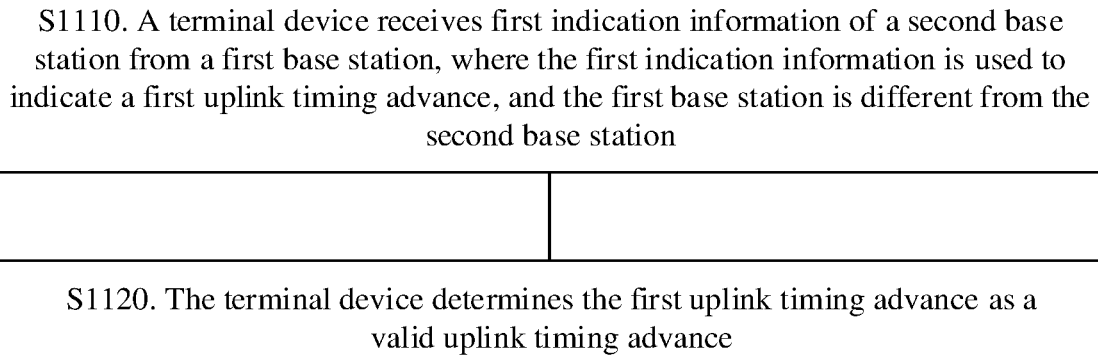
FIG. 12 is a schematic flowchart of another communication method according to an embodiment of this application.

FIG. 12 is a schematic flowchart of a communication method 1100 according to an embodiment of this application. As shown in FIG. 12, the method 1100 includes at least the following steps.

S1110. A terminal device receives first indication information of a second base station from a first base station, where the first indication information is used to indicate a first uplink timing advance, and the first base station is different from the second base station.

S1120. The terminal device determines the first uplink timing advance as a valid uplink timing advance.

Specifically, as an example instead of a limitation, in a handover scenario of base stations, for example, handover from the first base station to the second base station (for example, a target base station), the second base station generates the first uplink timing advance, and sends the first indication information to the first base station. The first indication information indicates the first uplink timing advance. The terminal device receives the first indication information sent by the first base station, and further determines the first uplink timing advance based on the first indication information.

After obtaining the first uplink timing advance, the terminal device further determines whether the first uplink timing advance is valid.

Optionally, the terminal device starts or restarts a first timer based on the first advance indication information. During running of the first timer, the terminal device determines the first uplink timing advance as the valid uplink timing advance.

Specifically, the terminal device initially starts or restarts a first timer based on the first advance indication information. During running of the first timer, the terminal device determines the first uplink timing advance as the valid uplink timing advance.

Optionally, after step 1120, the method further includes the following steps.

S1130. The terminal device obtains second indication information of the second base station, where the second indication information is used to indicate an allocated uplink transmission resource to the terminal device.

S1140. When the terminal device determines the first uplink timing advance as the valid uplink timing advance, the terminal device sends first data to the second base station based on the second indication information of the second base station and the first uplink timing advance.

Specifically, the terminal device obtains the second indication information of the second base station. The second indication information is used to indicate the allocated uplink transmission resource to the terminal device. The uplink transmission resource is mainly a physical resource (for example, a frequency domain resource). In addition, the uplink transmission resource may further include at least one of the following: a modulation and coding scheme, a hybrid automatic repeat request (Hybrid Automatic Repeat request, HARQ) identifier, a redundancy version, an indication used to indicate new transmission or retransmission, a period, a start position, and a frequency hopping indication. In this case, if the terminal device determines the first uplink timing advance as the valid uplink timing advance, the terminal device may send the first data to a network device by using the uplink resource based on the valid first uplink timing advance and the uplink resource indicated by the second indication information.

Optionally, the first data includes user plane data and/or control plane data. The user plane data includes data transmitted on a data radio bearer (DRB), and the control plane data includes data transmitted on a signaling radio bearer (SRB), for example, a radio resource control connection reconfiguration complete message and/or a media access control control element.

It should be noted that in this embodiment, the second indication information may be sent by the first base station to the terminal device, or may be sent by the second base station to the terminal device. This is not specifically limited in the embodiment of this application.

The terminal device determines the first uplink timing advance, so that the terminal device sends first data to the network device based on the first uplink timing advance. The first data may be used to notify the second base station that handover is completed.

It should be noted that, in this application, the foregoing first logical channel does not have an uplink resource for carrying a scheduling request. At least the following two cases are included.

Case 1: The terminal device does not have scheduling request resource configuration on the first logical channel. or Case 2: The terminal device has scheduling request resource configuration on the first logical channel but an uplink resource corresponding to the scheduling request configuration is released.

Figure 13:
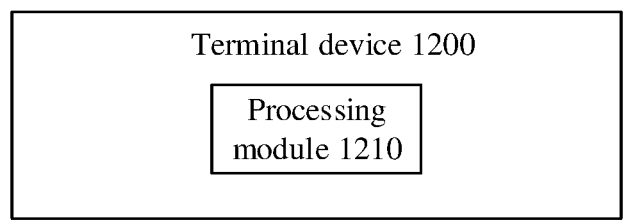
FIG. 13 is a schematic block diagram of a terminal device according to an embodiment of this application.

FIG. 13 is a schematic block diagram of a terminal device 1200 according to this application. As shown in FIG. 13, the terminal device includes:

a processing module 1210, configured to: if a first logical channel of the terminal device does not have an uplink resource for carrying a scheduling request and the terminal device is in a first scheduling request (SR) state, remain, by the terminal device, in the first SR state or a first buffer status report (BSR) state until data of the first logical channel or a buffer status report (BSR) is sent, where the BSR is used to indicate buffer status information of a logical channel group including the first logical channel, the first BSR state indicates that the buffer status report of the terminal device is triggered by the first logical channel and is not canceled, and the first SR state indicates that the scheduling request is triggered by the first logical channel and is not canceled.

Optionally, the processing module 1210 is configured to perform operations of the communication method 200 in the embodiment of this application. For brevity, details are not described herein again.

A processing module 1210 of the terminal device 1200 in this application is further configured to: if a first logical channel of the terminal device does not have an uplink resource for carrying a scheduling request and the terminal device is in a first buffer status report (BSR) state, remain, by the terminal device, in the first BSR state until data of the first logical channel or a buffer status report (BSR) is sent, where the BSR is used to indicate buffer status information of a logical channel group including the first logical channel, and the first BSR state indicates that the buffer status report of the terminal device is triggered by the first logical channel and is not canceled.

Optionally, the processing module 1210 is configured to perform operations of the communication method 300 in the embodiment of this application. For brevity, details are not described herein again.

Figure 14:
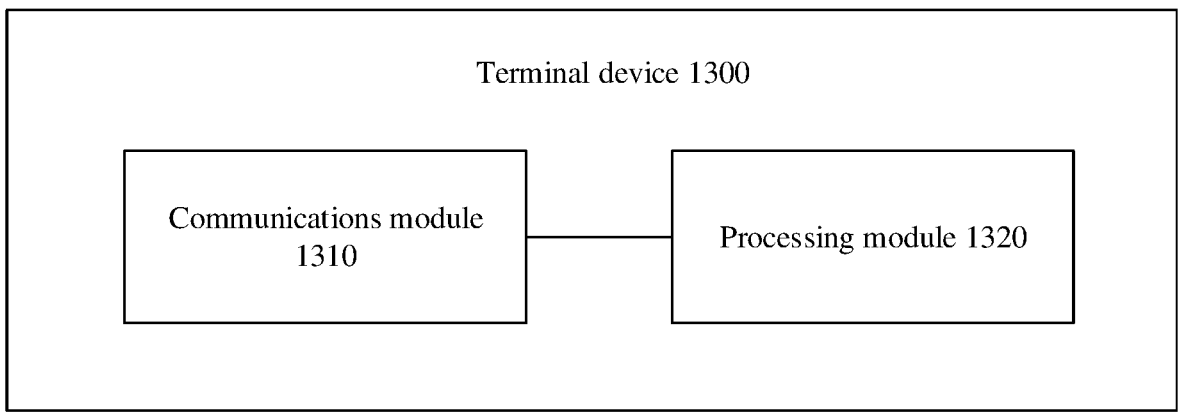
FIG. 14 is a schematic block diagram of another terminal device according to an embodiment of this application.

FIG. 14 is a schematic block diagram of a terminal device 1300 according to this application. As shown in FIG. 14, the terminal device includes:

a communications module 1310, configured to: if a first logical channel of the terminal device does not have an uplink resource for carrying a scheduling request and the terminal device is in a first scheduling request state, send, by the terminal device, the scheduling request to a network device based on first scheduling request configuration of a second logical channel, where the first scheduling request state is used to indicate that the scheduling request is triggered by the first logical channel and is not canceled, and the first scheduling request configuration is used to send a scheduling request trigged by the second logical channel.

Optionally, a priority of the second logical channel is the same as that of the first logical channel; or the second logical channel is a logical channel, of the terminal device, with a highest priority in at least one logical channel having scheduling request configuration; or the second logical channel is a logical channel, of the terminal device, with a lowest priority in at least one logical channel having scheduling request configuration; or the second logical channel is a logical channel, of the terminal device, whose scheduling request resource corresponding to the scheduling request configuration arrives earliest in at least one logical channel having scheduling request configuration.

Optionally, the terminal device further includes:

a processing module 1320, configured to: if a first uplink resource can meet data of the first logical channel and data of a logical channel corresponding to the first uplink resource, cancel, by the terminal device, the first scheduling request state; or if a first uplink resource can meet data of the first logical channel, cancel, by the terminal device, the first scheduling request state, where the first uplink resource is an uplink resource that is allocated to the terminal device for data transmission.

Optionally, the terminal device determines that the first scheduling request configuration meets a first condition, where the first condition includes that a moment at which the scheduling request triggered by the first logical channel is sent based on the first scheduling request configuration meets a time requirement of the scheduling request triggered by the first logical channel; and/or a success probability of the scheduling request triggered by the first logical channel within a range of the time requirement is greater than or equal to a threshold.

Optionally, that the first logical channel of the terminal device does not have the uplink resource for carrying the scheduling request is that the first logical channel does not have second scheduling request configuration; or the first logical channel has second scheduling request configuration but an uplink resource indicated by the second scheduling request configuration is released, where the second scheduling request configuration is used to send the scheduling request triggered by the first logical channel.

Figure 15:
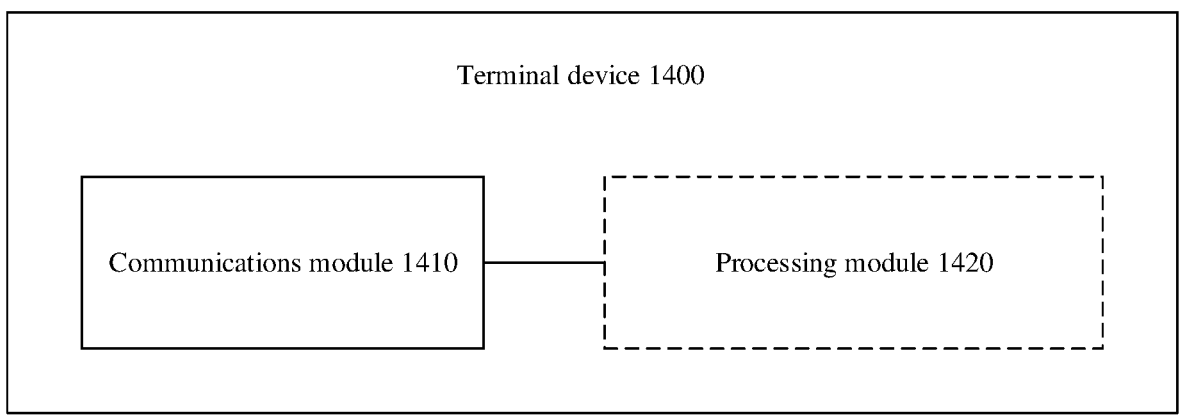
FIG. 15 is a schematic block diagram of another terminal device according to an embodiment of this application.

FIG. 15 is a schematic block diagram of a terminal device 1400 according to this application. As shown in FIG. 15, the terminal device includes:

a communications module 1410, configured to: if a first logical channel of the terminal device does not have an uplink resource for carrying a scheduling request and the terminal device is in a first scheduling request state, send, by the terminal device, a random access request message of the first logical channel to a network device based on first random access request configuration of the first logical channel, and cancel the first scheduling request state, where the first scheduling request state is used to indicate that the scheduling request is triggered by the first logical channel and is not canceled, and the first random access request configuration is used to send the random access request message of the first logical channel.

Optionally, that the terminal device determines a first uplink resource when the first logical channel does not have the uplink resource for carrying the scheduling request includes that the terminal device determines the first uplink resource when the terminal device does not have scheduling request resource configuration; or the terminal device determines the first uplink resource when the terminal device has scheduling request resource configuration but an uplink resource corresponding to the scheduling request resource configuration is released.

Optionally, the communications module 1410 is configured to perform operations of the communication method 500 in the embodiment of this application. For brevity, details are not described herein again.

Figure 16:
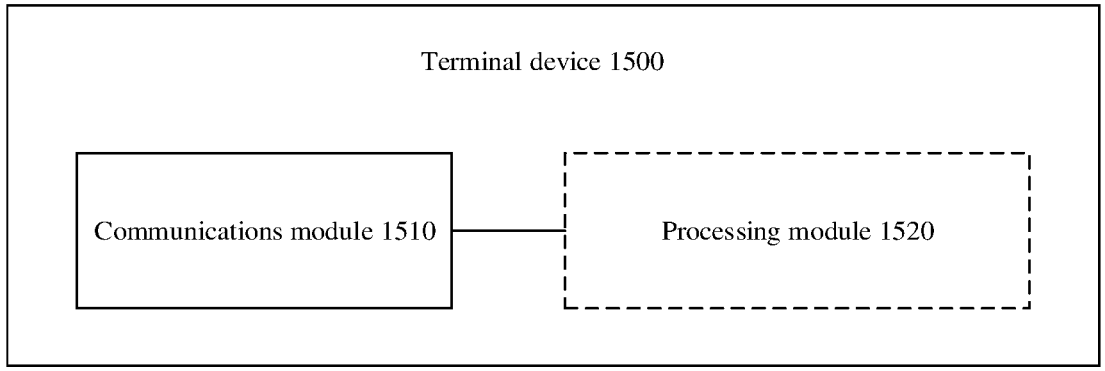
FIG. 16 is a schematic block diagram of another terminal device according to an embodiment of this application.

FIG. 16 is a schematic block diagram of a terminal device 1500 according to this application. As shown in FIG. 16, the terminal device includes:

a communications module 1510, configured to: when a first timer expires, if at least one logical channel of the terminal device has a data transmission requirement, send, by the terminal device, a scheduling request to a network device based on scheduling request configuration of a first logical channel, where the first logical channel is a logical channel that has the scheduling request configuration in the plurality of logical channels, the scheduling request triggered by the first logical channel is used to request the network device to allocate a first uplink resource to the terminal device, and the first uplink resource is used to transmit data of the at least one logical channel or a buffer status report of the terminal device.

Optionally, the first logical channel is a logical channel with a highest priority in a plurality of logical channels having scheduling request configuration; or the first logical channel is a logical channel with a lowest priority in a plurality of logical channels having scheduling request configuration; or the first logical channel is a logical channel whose scheduling request resource arrives earliest in a plurality of logical channels having scheduling request configuration; or the first logical channel is a preconfigured logical channel.

Optionally, the communications module 1510 is configured to perform operations of the communication method 900 in the embodiment of this application. For brevity, details are not described herein again.

Figure 17:
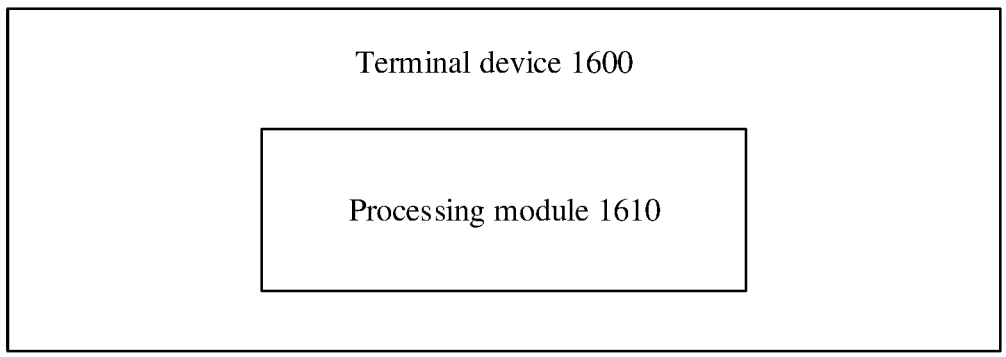
FIG. 17 is a schematic block diagram of another terminal device according to an embodiment of this application.

FIG. 17 is a schematic block diagram of a terminal device 1600 according to this application. As shown in FIG. 17, the terminal device includes:

a processing module 1610, configured to: determine, by the terminal device, not to trigger a scheduling request when the terminal device receives radio resource control (RRC) signaling from a network device and the terminal device triggers a buffer status report (BSR), where the radio resource control (RRC) signaling carries first indication information; or determine, by the terminal device, not to trigger a scheduling request when the terminal device does not receive radio resource control (RRC) signaling from a network device and the terminal device triggers a buffer status report (BSR), where the radio resource control (RRC)

signaling carries first indication information, and the first indication information indicates an uplink resource that is allocated by the network device to the terminal device.

Optionally, that the processing module 1610 is configured to determine, by the terminal device, to trigger the scheduling request when the terminal device does not receive the first indication information carried in the radio resource control (RRC) signaling from the network device includes that the terminal device determines to trigger the scheduling request when the terminal device does not receive the first indication information carried in the radio resource control (RRC) signaling from the network device and a condition for triggering the scheduling request is met.

Optionally, the processing module 1610 is configured to perform operations of the communication method 1000 in the embodiment of this application. For brevity, details are not described herein again.

Figure 18:
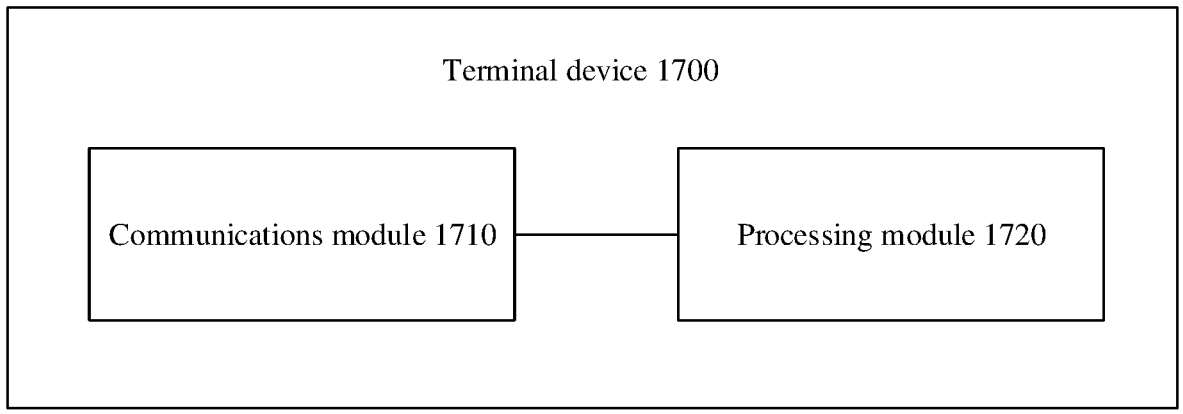
FIG. 18 is a schematic block diagram of another terminal device according to an embodiment of this application.
Figure 19:
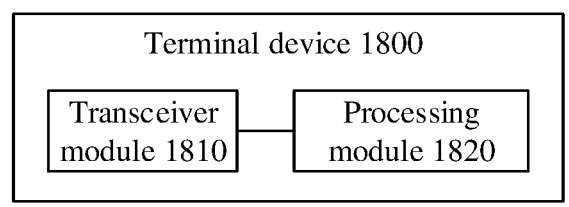
FIG. 19 is a schematic block diagram of another terminal device according to an embodiment of this application.
Figure 20:
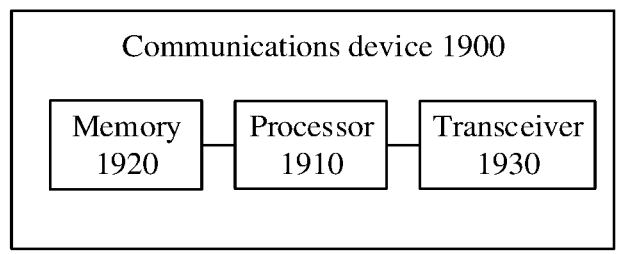
FIG. 20 is a schematic block diagram of a communications device according to an embodiment of this application.

FIG. 18 is a schematic block diagram of a terminal device 1700 according to this application. As shown in FIG. 18, the terminal device includes:

a communications module 1710, configured to: receive, by the terminal device, first indication information of a second base station from a first base station, where the first indication information is used to indicate a first uplink timing advance, and the first base station is different from the second base station; and a processing module 1720, configured to determine, by the terminal device, the first uplink timing advance as a valid uplink timing advance.

That the processing module 1720 is specifically configured to determine, by the terminal device, the first uplink timing advance as the valid uplink timing advance includes that the terminal device starts or restarts a first timer based on the first advance indication information; and the terminal device determines the first uplink timing advance as the valid uplink timing advance during running of the first timer.

Optionally, the processing module 1720 is further configured to obtain, by the terminal device, second indication information of the second base station, where the second indication information is used to indicate an allocated uplink transmission resource to the terminal device.

Optionally, the communications module 1710 is further configured to: when the terminal device determines the first uplink timing advance as the valid uplink timing advance, send, by the terminal device, first data to the second base station based on the second indication information of the second base station and the first uplink timing advance.

The terminal device corresponds to the terminal device in the method embodiments, and corresponding steps are performed by corresponding modules. For details, refer to the corresponding method embodiments.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, reference may be made to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication method, comprising:
sending, by a terminal device when a first timer expires and at least one logical channel of the terminal device has a data transmission requirement, a scheduling request to a network device based on scheduling request configuration of a first logical channel, wherein the first logical channel is a logical channel that has a scheduling request configuration in the at least one logical channels, the scheduling request is used to request the network device to allocate a first uplink resource to the terminal device, and the first uplink resource is used to transmit at least one of data of the at least one logical channel and a buffer status report (BSR), wherein a plurality of logical channels have the scheduling request configuration and the first logical channel is a logical channel whose scheduling request resource arrives earliest in the plurality of logical channels having the scheduling request configuration.

2. The method according to claim 1, wherein the at least one logical channel belongs to a logical channel group.

3. The method according to claim 1, further comprising:
sending, by the terminal device, the BSR to the network device;
starting or restarting, by the terminal device, the first timer in response to the sending of the BSR.

4. The method according to claim 3, further comprising:
triggering, by the terminal device when the first timer expires and the at least one logical channel has a data transmission requirement, another BSR; and
triggering, by the terminal device, another scheduling request.

5. A communication apparatus, comprising a processor, configured to run a program stored in a memory, wherein the program, when executed by the processor, causes the apparatus to:
send, when a first timer expires and at least one logical channel of the apparatus has a data transmission requirement, a scheduling request to a network device based on a scheduling request configuration of a first logical channel, wherein the first logical channel is a logical channel that has scheduling request configuration in the at least one logical channels, the scheduling request is used to request the network device to allocate a first uplink resource to the apparatus, and the first uplink resource is used to transmit at least one of data of the at least one logical channel and a buffer status report (BSR),
wherein a plurality of logical channels have the scheduling request configuration and the first logical channel is a logical channel whose scheduling request resource arrives earliest in the plurality of logical channels having the scheduling request configuration.

6. The apparatus according to claim 5, wherein the at least one logical channel belongs to a logical channel group.

7. The apparatus according to claim 5, wherein the program, when executed by the processor, causes the apparatus further to:

send the BSR to the network device;
start or restart the first timer in response to the sending of the BSR.

8. The apparatus according to claim 7, wherein the program, when executed by the processor, causes the apparatus further to:
trigger, when the first timer expires and the at least one logical channel has a data transmission requirement, another BSR; and
trigger another scheduling request.

9. A non-transitory computer storage medium, comprising a program, wherein when executed by a processor, the following steps are performed:
sending, when a first timer expires and at least one logical channel of the apparatus has a data transmission requirement, a scheduling request to a network device based on a scheduling request configuration of a first logical channel, wherein the first logical channel is a logical channel that has scheduling request configuration in the at least one logical channels, the scheduling request is used to request the network device to allocate a first uplink resource to the apparatus, and the first uplink resource is used to transmit at least one of data of the at least one logical channel and a buffer status report (BSR),
wherein a plurality of logical channels have the scheduling request configuration and the first logical channel is a logical channel whose scheduling request resource arrives earliest in the plurality of logical channels having the scheduling request configuration.

10. The non-transitory computer storage medium according to claim 9, wherein the at least one logical channel belongs to a logical channel group.

11. The non-transitory computer storage medium according to claim 9, wherein the program, when executed by the processor, the following steps are further performed:
send the BSR to the network device;
start or restart the first timer in response to the sending of the BSR.

12. The non-transitory computer storage medium according to claim 11, wherein the program, when executed by the processor, the following steps are further performed:
trigger, when the first timer expires and the at least one logical channel has a data transmission requirement, another BSR; and
trigger another scheduling request.

* * * * *